United States Patent
Matsui et al.

[11] Patent Number: 6,115,266
[45] Date of Patent: Sep. 5, 2000

[54] SWITCHING POWER SOURCE WITH A DIGITAL CONTROL CIRCUIT TO MAINTAIN A CONSTANT DC OUTPUT SIGNAL

[75] Inventors: Nobuyuki Matsui, Kasugai; Koichiro Miura, Ichikawa; Shigetaka Maeyama, Sakura; Takaharu Takeshita, Aichi-Ken, all of Japan

[73] Assignee: TDK Corporation, Tokyo, Japan

[21] Appl. No.: 09/011,786

[22] PCT Filed: Jun. 24, 1997

[86] PCT No.: PCT/JP97/02172

§ 371 Date: Jul. 13, 1998

§ 102(e) Date: Jul. 13, 1998

[87] PCT Pub. No.: WO97/50165

PCT Pub. Date: Dec. 31, 1997

[30] Foreign Application Priority Data

| Jun. 24, 1996 | [JP] | Japan | 8-163505 |
| Oct. 11, 1996 | [JP] | Japan | 8-270305 |
| Jan. 20, 1997 | [JP] | Japan | 9-008107 |

[51] Int. Cl.[7] ............... H02M 3/335
[52] U.S. Cl. ........................ 363/21
[58] Field of Search ................ 363/21, 97

[56] References Cited

U.S. PATENT DOCUMENTS

| 4,128,771 | 12/1978 | Domenico . | |
| 5,272,614 | 12/1993 | Brunk et al. . | |
| 5,349,523 | 9/1994 | Inou et al. . | |
| 5,406,468 | 4/1995 | Booth | 363/21 |
| 5,675,480 | 10/1997 | Stanford | 363/21 |

FOREIGN PATENT DOCUMENTS 0 520 480  12/1992  European Pat. Off. .

| 52-119028 | 9/1977 | Japan . |
| 60-035958 | 2/1985 | Japan . |
| 63-003651 | 1/1988 | Japan . |
| 2-074152 | 3/1990 | Japan . |
| 5-43789 | 6/1993 | Japan . |
| 7-075342 | 3/1995 | Japan . |
| 7-231661 | 8/1995 | Japan . |
| 8-126303 | 5/1996 | Japan . |

OTHER PUBLICATIONS

"Digital Control of DC/DC Converter", by Isao Fujiwara et al, Technical Report of IEICE PE94–2 (May 1994), pp. 9–16; English language Abstract on p. 9.

"The Influence of Optimal Programmed Pulse Width Modulation on the Static and Dynamic Output Behaviour of a Digital Controlled DC/DC–Converter", S. Huth, EPE '95:6th European Conference on Power Electronics and Applications, pp. 1.758–1.763, Sep. 19–21, 1995.

*Primary Examiner*—Shawn Riley
*Attorney, Agent, or Firm*—Frishauf, Holtz, Goodman, Langer & Chick, P.C.

[57] ABSTRACT

A switching power source having a digital control system is provided. The switching power source includes a switching circuit 40 for switching an input power, an output circuit 50 for converting the switching output into a DC output, and a digital control 70. The digital control 70 is adapted to receive an output voltage analog signal AS1 and an output current analog signal AS2, and to convert the signals AS1 and AS2 into digital signals. It further functions to calculate, based on the digital signals, a command value for determining at least one of the switching frequency and the on or off time of the main switch 42. The operation of the main switch 42 is controlled in accordance with the command value. Information on power source input voltage or load terminal voltage is obtained through an assumption based on the signals AS1 and AS2.

17 Claims, 10 Drawing Sheets

SWITCHING POWER SOURCE WITH A DIGITAL CONTROL CIRCUIT TO MAINTAIN A CONSTANT DC OUTPUT SIGNAL

FIELD OF THE INVENTION

The present invention relates to a switching power source arrangement. More particularly, the present invention relates to a switching power source arrangement including a switching circuit for switching input electric power to produce an output of a pulsating wave form, the pulsating output produced by the switching circuit being then converted into a DC output, the DC output being monitored by a control circuit which is adapted to control the switching circuit so that a substantially constant DC output voltage is maintained. More specifically, the present invention pertains to a switching power source arrangement having such control circuit comprising a digital circuit.

BACKGROUND OF THE INVENTION

In conventional switching power source arrangement, it has been common to provide such control circuit with an analogue circuit. In this instance, the output voltage and the output current are detected in terms of analogue signals which are processed in the form of analogue values, the results of the processing being used to produce control signals for controlling the switching operation.

In general, in switching power sources, operating modes of power converter circuit may be changed in accordance with changes in input voltage or load current. In this instance, it is required that a plurality of control algorithms be provided for the respective ones of the control modes, which are appropriately selected to accomplish the most appropriate control. It should however be noted that the conventional switching power source including such analogue control circuit is designed to perform a signal processing in the control circuit mostly based on a hardware circuit structure so that control circuits or hardware structures have to be provided in advance for the respective ones of the control algorithms so that they can be selectively used in accordance with the operating modes in order to accomplish the most appropriate control through a selection of a control algorithms in accordance with a change in the operating mode in the power converter circuit. This will mean that a plurality of hardware control circuits have to be provided. The structure is therefore complicated in circuit construction so that it is practically unsatisfactory.

In a conventional switching power source having an LC filter and diode for eliminating ripple, there are produced two different operating modes, one being a continuous mode and the other a discontinuous mode, which are produced depending on the value of the load current. It is common in a conventional switching power source utilizing an analogue control circuit to use, even under an operating condition wherein the inductor current is discontinuous, methods or sequences of signal processing which are designed with control models under conditions wherein the inductor current is continuous. This is because the fact that it is difficult or make the structure complicated and uneconomical to change the methods or the sequences of signal processing depending on the load condition. Therefore, the control models are inappropriate under an operating condition where the inductor current is discontinuous so that unsatisfactory conditions are produced in respect of stabilities in the output voltage and the control systems.

A resonance type power source has been developed primarily for decreasing the switching loss in the switching power source arrangement. However, this technology is still in the process of development so that there is no available unified circuit system. Thus, there is no unified control algorithms in this type of power source for the respective circuit systems and different control circuits are provided for different circuit systems. Thus, there are serious problems in an effort to provide a standardized control circuit comprising a control IC.

A non-resonance type circuit system generally has a plurality of operating modes. Therefore, in order to provide a stabilizing control through an analogue circuit system, it is required to provide a plurality of control circuits for carrying out control algorithms for the respective ones of the control modes and selectively use one of these control circuits in accordance with the op-operating mode. However, in actual practice, this solution further involves a problem in that a complicated control circuit is required.

In a switching power source for a special use such as a battery charger, it is required to provide a constant current characteristic for providing a substantially constant output current and a constant power characteristic for providing a substantially constant output power as well as a constant voltage characteristic for providing a substantially constant output voltage. In this instance, it is also required to provide a plurality of control algorithms for the respective ones of the operating modes since the respective characteristics require different operating modes. It will therefore be noted that in switching power source arrangements having control circuits of analogue type it is required to provide a plurality of control circuits for respective ones of the aforementioned control algorithms and selectively use one of the control circuits in accordance with the operating mode. However, in actual practice, this arrangement has a problem in that the circuit is made complicated as in the case of a resonance type power source.

In trying to perform a control based on the input voltage, the output voltage and the output current in a conventional switching power source having an analogue control circuit, it is required to provide detecting circuits for obtaining information on actual values of such input voltage, output voltage and output current. Particularly, in a power source arrangement having an insulation between the input and the output, it is required to provide insulations in certain portions of signal transmitting lines which are provided for taking the information into the control circuit. Thus, the circuit arrangements become complicated and the number of components in the circuit will be increased.

As describe, in a conventional switching power source having a control circuit of analogue type, it is required to provide different hardware such as different circuits or circuit components in order to enable such selective use or change of the control algorithm. This will mean that hardware standardization will be seriously disturbed and as a result it necessary to produce a variety of products in a small quantity, so that there will be problems of reduction in the design efficiency and productivity.

Further, as a matter of general consideration, it is necessary to take into account the relationship between the switching power source and the load device. It is common that the output of the switching power source be connected through a load line to a load device. In this instance, it is ideal that the voltage supplied by the switching power source be controlled in such a manner that the voltage across the load terminals at the opposite ends of the load is maintained constant. However, in many switching power sources, voltage detecting circuits are provided in the switching power source so that control is made on the output voltage at the output portion of the switching power source to maintain the output voltage constant. This type of control has a problem that the voltage across the load terminals becomes lower than desired due to a voltage drop at the load line.

There may be several solutions for the problem. However, in the system wherein the voltage at the output portion of the switching power source arrangement is controlled to be constant, none of them will be effective to provide a satisfactory control under a possible fluctuation of load. There is apparently a limit in solving such problems if the system utilizes a switching control by means of an analogue circuit.

The Japanese Laid-Open Patent Publication No. Hei 2-74152 discloses a switching power source having a digital control device adopted for controlling the switching circuit. The switching power source disclosed in this patent publication includes a switching circuit for switching an input electric power and a smoothing circuit for smoothing the output of the switching circuit to provide an output, a digital controller being provided for controlling the switching circuit. The digital controller produces control pulse signals of a predetermined duty factor in accordance with the value of the output from the switching power source, the control pulse signals being applied to the switching circuit to control the operation of the switching circuit.

The patent publication teaches for a switching power source including a digital control means of this type a technique for providing an appropriate control in response to fluctuations in the input voltage to the switching power source which may be produced when there are fluctuations in the output of a power source which is provided for supplying an input to the switching power source. More specifically, the patent publication recommends a structure wherein a plurality of processing formulas are provided and a desired one of the formulas is selected in accordance with a detected value of the input voltage to the switching power source. In this instance, the input voltage is detected by input voltage detecting means.

SUMMARY OF THE INVENTION

It is one object of the present invention to provide a novel switching power source arrangement which adopts a digital control system so that control algorithms can be readily selected in terms of software in accordance with operating modes.

Another object of the present invention is to provide a novel switching power source which is capable of selecting control algorithms in accordance with operating modes but in which circuit complexity is not increased even with an increase in number of the control algorithms.

A further object of the present invention is to provide a switching power source arrangement which can utilize a standardized hardware.

Yet a further object of the present invention is to provide a switching power source arrangement wherein the number of detecting circuits required for obtaining control commands can be decreased, the circuit structure can be simplified, and circuit components can be decreased in number.

In order to accomplish the objects set forth above, the switching power source arrangement in accordance with the present invention includes a switching circuit for switching an input electric power, an output circuit for converting the output of the switching circuit into a DC output, and a digital control. The digital control receives as an input an analogue signal of a voltage and/or current from the output circuit, converts the analogue signal into a digital signal, calculates a command value in accordance with the thus obtained output voltage digital signal and/or the output current digital signal for determining at least one of switching frequency and on or off time period of the switching circuit to produce a pulse based on the command value, the pulse being applied to the switching circuit for controlling the switching operation.

According to one aspect of the present invention, the output voltage analogue signal and/or output current analogue signal is taken into the digital control in synchronism with switching cycles of the switching circuit at the same phase in each cycle of the switching operation, the output voltage digital signal and/or output current digital signal being produced based on such analogue signal. The output current analogue signal may be produced based on current in any place in the output section. For example, in an arrangement which includes a smoothing circuit provided in the output circuit for rectifying and smoothing the output and the smoothing circuit includes an inductor, inductor current flowing through the inductor may be detected to produce the output current analogue signal.

The interval of calculating the command value may be integral times of the switching cycle and the analogue signal is taken into the control at least once in every cycle of calculation of the command value. In the switching power source, the output after smoothing in the smoothing circuit still has a certain extent of cyclical variations which correspond to the switching cycle of the switching circuit, however, any effect of the cyclic variation can be minimized by utilizing the analogue signal taken into the control at the same phase in the switching cycle for producing the digital signal which is then used for the calculation of the command value. It is therefore possible in this aspect of the present invention to eliminate any otherwise required data pre-processing such as data averaging.

In another aspect of the present invention, the digital control includes a function of presuming power source input voltage and/or load terminal voltage in the load device based on the output voltage digital signal and output current digital signal. In accordance with this aspect of the present invention, it becomes unnecessary to provide power source input voltage detecting means or load detecting means.

As described above, the switching power source arrangement includes a digital control for the switching control operation so that any control algorism can be appropriately selected in accordance with the operating mode in terms of software. It should further be noted that any increase in number of control can be dealt with by means of software so that it is possible to avoid circuits from becoming complicated. It should be pointed out that the digital control as described is effective to ensure stability of the control system. It is possible to have the hardware digital control standardized since any required algorism can be provided in terms of software.

In accordance with the aforementioned aspect of the present, the power source input voltage information and/or load terminal voltage information is not obtained through detection by a detection circuit but derived form an information obtained through a presumption based on the output voltage digital signal and output current digital signal. Such presumption is made possible by the adoption of the digital control system. Thus, it is possible to obtain an input voltage information without having an input voltage detection circuit, so that the number of the detection circuit can be decreased resulting in simplification of circuits and a decrease in number of circuit components.

A preferable mode of utilizing the power source input voltage information obtained through the presumption is to use, together with the output voltage digital signal and the output current digital signal, the power source input voltage information and/or load terminal information thus obtained through presumption as a factor for determining at least one command value for the switching frequency and on time or off time. The command value is then used to produce a control pulse which is supplied to the switching circuit to control the operation of the switching circuit.

In the meaning of the present invention, to determine at least one of the switching frequency, on time and off time is intended to mean typically either of such cases wherein these factors are separately determined, both the switching frequency and the on time are determined, or the switching frequency and the off time are determined.

Another way of using the power source input voltage information and/or load terminal voltage information obtained through the presumption is to determine the condition of the input voltage, for example, to detect a disorder of the power source input, and to determine the load terminal voltage on the basis of the load terminal voltage information, for example, to detect an overload condition. When it is determined that there is a disorder in the power source input, the output voltage digital signal and the output current digital signal are used for the power source control.

Other objects, arrangements and advantages of the present invention will become apparent from the following description of embodiments taking reference to the accompanying drawings.

BEST MODE FOR CARRYING OUT THE INVENTION

Figure 1:
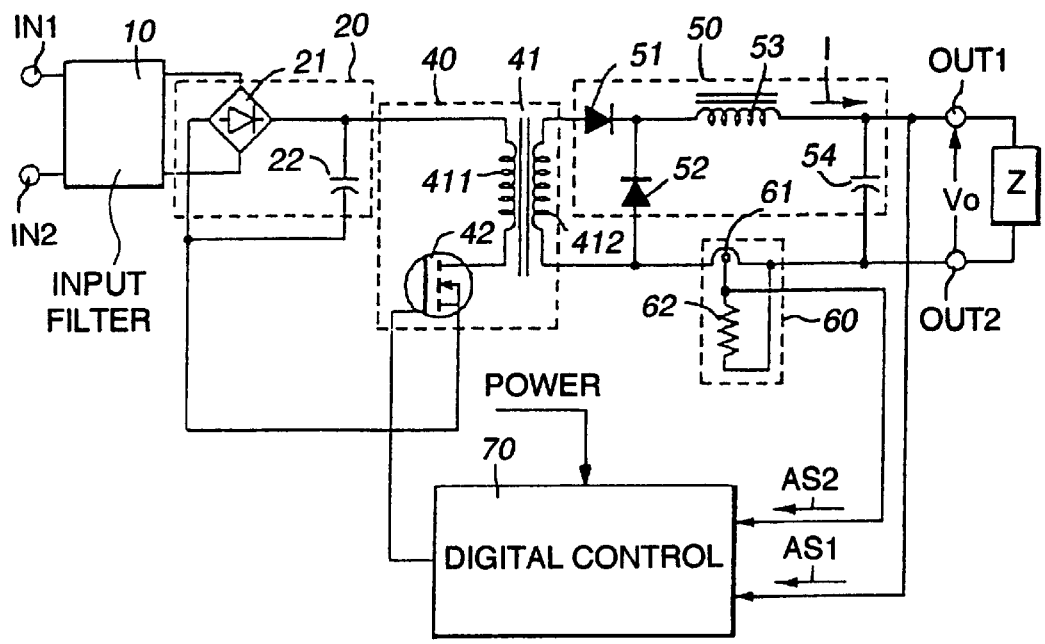
FIG. 1 is a block diagram showing one embodiment of the switching power source arrangement in accordance with the present invention.

Referring to FIG. 1, there is shown an electric circuit for a switching power source arrangement in accordance with the present invention. The switching power source in accordance with the present invention includes a switching circuit 40 adapted for switching input electric power to form an output of a pulsating waveform, an output circuit 50 adapted for converting the switched output of the pulsating waveform into DC power, and a digital control 70.

In the illustrated embodiment, the switching power source arrangement has input terminals IN1 and IN2 to which AC input power is applied. The AC input power applied to the input terminals IN1 and IN2 is passed through an input filter 10 to a rectifier smoothing circuit 20. The rectifying or smoothing circuit 20 includes a full wave rectifying diode 21 and a smoothing capacitor 22. The output from the rectifying or smoothing circuit 20 is applied to a switching circuit 40.

The switching circuit 40 functions to effect an on-off control on the power supplied from the rectifying or smoothing circuit 20. The switching circuit 40 comprises a switching element 42 comprised of a field effect transistor (FET) and a main transformer 41 adapted for connecting the on-off output from the switching element 42 with the output circuit 50. The switching element 42 has a drain which is connected in series with one of the terminals of a primary winding 411 of the main transformer 41. The other terminal of the primary winding 411 of the main transformer 41 is connected with the rectifying or smoothing circuit 20.

The output circuit 50 is comprised of a rectifying or smoothing circuit which is adapted for producing an output by converting the pulse output supplied from the switching circuit 40 into DC power. The DC output V0 is supplied through output terminals OUT1 and OUT2 to the load Z. The output circuit 50 has a power line which is connected with an output current detection circuit 60 for detecting output current I. For the purpose of obtaining a stabilized output, the output circuit 50 is comprised of a choke input type smoothing circuit. The illustrated smoothing circuit includes diodes 51 and 52, an inductor 53 and a capacitor 54. One of the diodes, that is, the diode 51 has an anode which is connected in series with one terminal of a secondary winding of the main transformer 41. The other diode 52 is connected in parallel with the secondary winding 412 or the main transformer 41 and has a cathode connected with the cathode of the diode 51. The inductor 53 is connected to a connection between the diodes 51 and 52. The capacitor 54 is connected with the output side end of the inductor 53.

The output from the output circuit 50 is taken out as a voltage analogue signal AS1 and the output from the output current detection circuit 60 is taken out as a current analogue signal AS2, these signals being supplied to the digital control 70. The digital control 70 produces a control output which is supplied to the switching element 42 which constitutes the switching circuit 40. The switching element 42 functions to determine a duty factor which is a ratio of on time to off time in a switching cycle which is defined as a sum of the on time and the off time.

The digital control 70 has inputs which receive the voltage analogue signal AS1 from the output circuit 50 and the current analogue signal AS2 from the output current detection circuit 60 and function to convert these analogue signals AS1 and AS2 respectively into digital signals. The digital control 70 then effects, based on the output voltage digital signal and the output current digital signal thus obtained and on the input voltage information, calculation to determine a command value which determines the on and off time of the switching circuit 40. Instead of, or in addition to determining the on and off time of the switching circuit 40, the command value may be used to determine the switching cycle. The cycle period for conducting the calculation of the command value (hereinafter, may be referred as "control cycle") may be an integer times of the switching cycle so that the calculation of the command value will be carried out once in a plurality of switching cycles.

In an operating mode wherein the input voltage information is used for calculating the command value, a required input voltage information is obtained through a presumption based on the output voltage digital signal and the output current digital signal. It is possible to provide the digital control 70 with a function for detecting a disorder of the input voltage from the power source input voltage information. With this provision, it becomes possible to maintain an appropriate operation even under a disorder of the input voltage.

In an operating mode wherein the load terminal voltage information is used for the calculation of the command value, the required load terminal voltage information is derived through a presumption or a prelimary calculated value, based on the output voltage digital signal and the output current digital signal. The term "load" is intended to mean a load device which is connected with the switching power source through a load line. It is possible to provide the digital control with a function for determining the load terminal voltage based on the load terminal voltage information which has been obtained through the presumption. It is also possible in this instance to detect a disorder of the load terminal voltage. Further, in this operating mode, it is possible to apply the digital control with an information on the DC resistance value of the load line, and it is further possible to change the thus applied DC resistance value of the load line. Thus, in this operating mode of the present invention, the DC resistance value of the load line which is required for the presumption of the load terminal voltage can be applied or changed by means of a software.

The digital control 70 then produces pulses based on the command value and applies the thus produced pulses to the switching circuit 40 so as to control the switching operation of the same. Thus, the DC output voltage V0 and the output current I in the output terminals OUT1 and OUT2 are controlled.

As described, the switching power source in accordance with the present invention adopts a digital control system including the digital control 70 so that the control algorithms for the respective operating modes can be executed readily by software. Further, since any increase in number of the control algorithms can be dealt with by software, there will be no risk of the circuits becoming complicated. It is possible to have the hardware of the digital control 70 standardized since the required algorithms can be provided by software.

When the digital control 70 conducts a calculation for determining at least one of the switching frequency of the switching circuit 40, the on time and the off time, the output voltage digital signal and the output current digital signal are obtained through a digital conversion of the analogue signals actually obtained by detection using the detection circuits. However, in accordance with the illustrated embodiment, it is contemplated that use is made of an information derived through presumption based on the output voltage digital signal and the output current digital signal. Such presumption is made possible by the utilization of the digital control. It is therefore possible to decrease the number of the detection circuits required for obtaining the control command value to thereby make the circuits simple in construction, and decrease the number of the circuit components.

Figure 2:
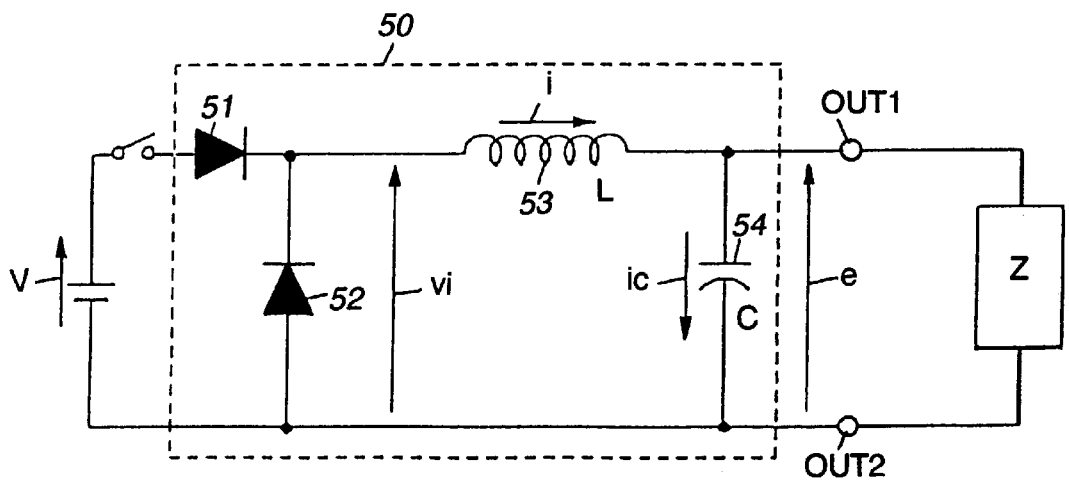
FIG. 2 is a circuit diagram of the switching power source arrangement shown in FIG. 1.

An example for the method for presuming or a prelimary calculated value, the input voltage information will now be described. FIG. 2 is a diagrammatical circuit diagram of the switching power source arrangement shown in FIG. 1. In this diagram, the following formula (1) can be established.

$$Vi(t)=L\,[di(t)/dt]+e(t) \quad (1)$$

The formula (1) can be converted into the following formula (2) for the application to a digital processing.

$$Vi(n-1)=L\,[i(n)-i(n-1)]/Tc+e(n-1) \quad (2)$$

where: Vi(n−1): the average voltage during the period between the time (n−1) and the time n L: the inductance of the inductor 53 i(n): the inductor current at the time n i(n−1): the inductor current at the time n−1

Tc: the sampling period e(n−1): the output voltage at the time (n−1)

Now, taking the sampling cycle Tc m times as large as the switching cycle T (herein m is an integer) and designating the switch on time period in the switching cycle by Ton, the following relationship is established between the average voltage Vi(n−1) and the input voltage V(n−1).

$$Vi(n-1)=mTon\cdot V(n-1)/Tc \quad (3)$$

From the formulae (2) and (3), the actual current i(n) at the sample timing n will be:

$$i(n)=i(n-1)+Tc\cdot[mTon\cdot V(n-1)/Tc-e(n-1)]/L \quad (4)$$

On the other hand, where there is no input voltage detection circuit, it is impossible at the digital control 70 to know the accurate value of the input voltage V, so that the current ie(n) at the sampling point n is calculated based on the assumption value Ve(n−1) in accordance with the following formula (5) which is derived from the formula (4).

$$ie(n)=i(n-1)+Tc\cdot[mTon\cdot Ve(n-1)/Tc-e(n-1)]/L \quad (5)$$

From the formulae (4) and (5)# the current presumption error Δi(n) is calculated as in the following formula (6).

$$\Delta i(n)=i(n)-e(n)=mTon\cdot\Delta(n-1)/L \quad (6)$$

where ΔV(n−1) is a voltage presumption error which is defined by the following formula (7).

$$\Delta V(n-1)=V(n-1)-Ve(n-1) \quad (7)$$

It will be noted in the above description that an accurate presumption of the input voltage V(n−1) can be made by detecting the output voltage e(n) and the inductor current i(n) flowing through the inductor 53 at the sampling time n, and conducting a calculation in the digital control based on the formulae (6) and (7). Therefore, in accordance with the embodiment of the present invention, it is not required to provide a detection circuit for detecting the input current in each sampling time.

Figure 3:
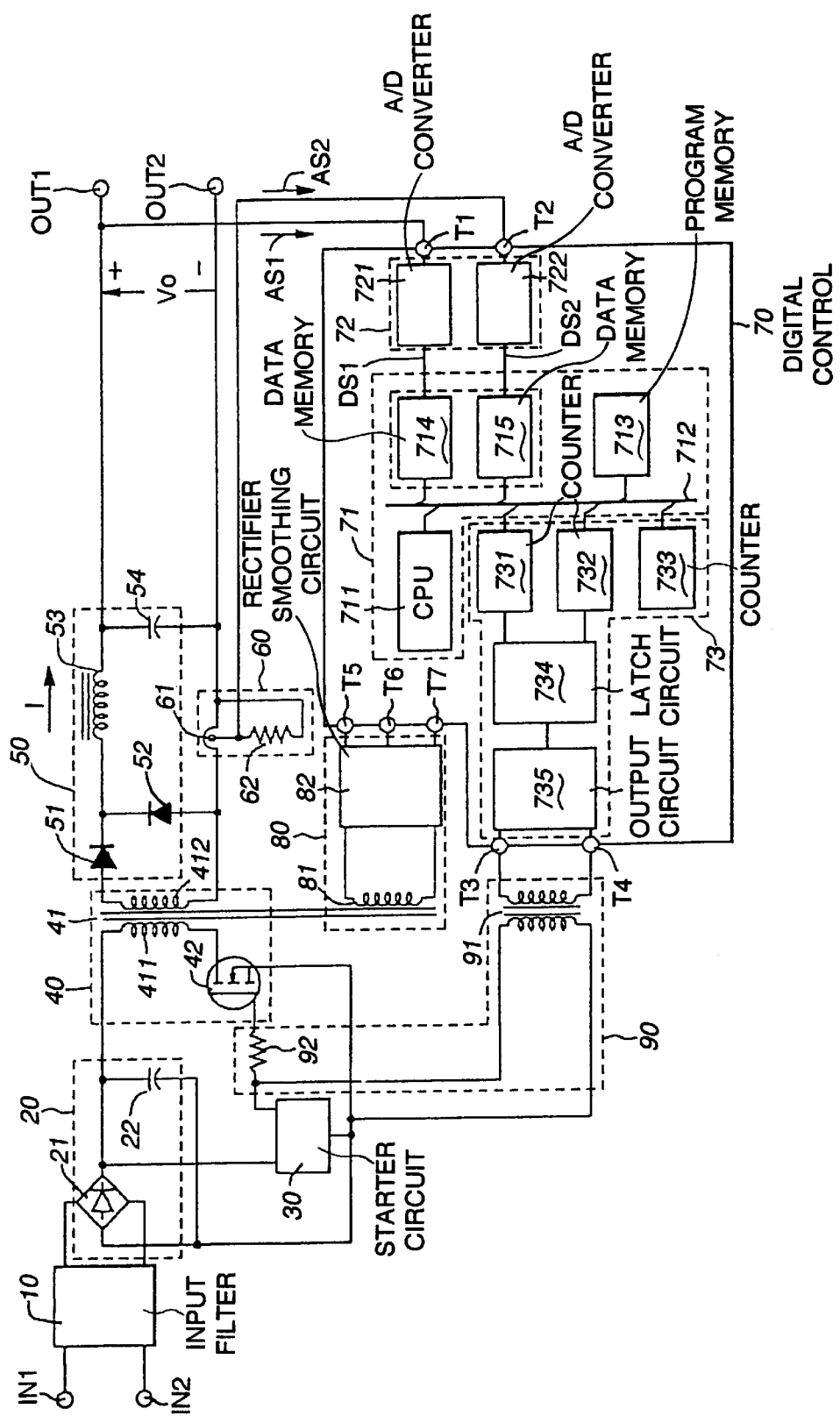
FIG. 3 is a block diagram showing a more specific embodiment of the switching power source arrangement in accordance with the present invention.

Referring to FIG. 3, there is shown a specific circuit for the switching arrangement of the present invention. In the drawing, similar components as in FIG. 1 are designated by the same reference numerals and detailed description is not made. In the embodiment shown, the rectifier smoothing circuit 20 is connected with a starter circuit 30. The starter circuit 30 serves to generate electric power for operating the digital control 70 during a starting period after the power source is connected. The starter circuit 30 has an output connected with a driver circuit 90.

The main transformer 41 is connected with an auxiliary power circuit 80. The auxiliary power circuit 80 constitutes a power source for the digital control 70 and includes a circuit 82 having a rectifier smoothing circuit connected with an auxiliary winding 81 provided in the main transformer 41. The auxiliary power circuit 80 functions to provide a source voltage which is supplied to the digital control 70 by being connected to source terminals T5 to T7 provided in the digital control 70.

The output current detection circuit 60 includes a current sensor 61 for detecting the inductor current I and a resistor 62 which functions to convert the current value into a voltage value. The current sensor 61 may be connected in series with the inductor 53. In the illustrated embodiment, the output circuit 50 is in the form of a choke input type rectifier smoothing circuit, so that the output current detection circuit 60 is designed to detect the inductor current in the inductor 53 provided in the output circuit as a voltage value. Therefore, the output current detection circuit 60 may hereinafter be referred as the inductor current detection circuit 60.

The digital control 70 includes an AD converter section 72, a digital signal processing section 71 and a pulse generating section 73. The digital control 70 comprises as a primary component a digital signal processor which is often referred as DSP. The DSP may include the digital converter section 72 in it. Where the digital control 70 comprises a DSP, the pulse generating section 73 may be provided as a component of the DSP, or partly or totally provided as a separate part and attached to the DSP.

The AD converter section 72 functions to convert the output voltage analogue signal AS1 and the inductor current analogue signal AS2 into digital signals DS1 and DS2, respectively. The AD converter section 72 may include an AD converter 721 and an AD converter 722. The AD converter 721 receives the output voltage analogue signal AS1 and AD converter 722 receives the inductor current analogue signal AS2.

The digital signal processing section 71 in the digital control 70 includes a program memory 713, data memories 714 and 715 and a central processing unit (CPU) 711. The data memories 714 and 715 serve to temporarily store the data in the digital signals DS1 and DS2, respectively. The digital signal from the AD converter section 72 may be supplied in each switching cycle, or alternatively, in each command value calculating cycle or in each control cycle. In any case, it is preferable to supply the data in synchronism with the switching cycle or the control cycle so that the data is supplied at the same phase in each cycle. By conducting the command value calculation based on the data taken in the same phase, it becomes possible to omit a data pre-processing such as data averaging. The CPU 711 receives the data from the data memories 714 and 715 through a bus 712 and performs a necessary calculation such as arithmetical operations or logic operations.

The pulse generating section 73 includes counters 731, 732 and 733, a latch circuit 734 and an output circuit 735. The counter 731 receives the command value from the digital signal processing section 71 and determines the off timing of the main switch 42 based on the command value. The counter 732 receives the command value from the digital signal processing section 71 and determines the on timing of the main switch 42 based on the command value. The counter 733 determines the cycle time period for the command value calculation or the control cycle.

The latch circuit 734 is set at the on timing as determined by the counter 732 (logic 1), and reset at the off timing as determined by the counter 731 (logic 0). Thus, the latch circuit 734 produces pulse output for driving the main switch 42.

The driving circuit 90 includes a pulse transformer 91 for transmitting a drive signal to the switching circuit 40 and a resistor 92. The drive signal from the digital control 70 is transmitted through the resistor 92 to the main switch 42.

Figure 4:
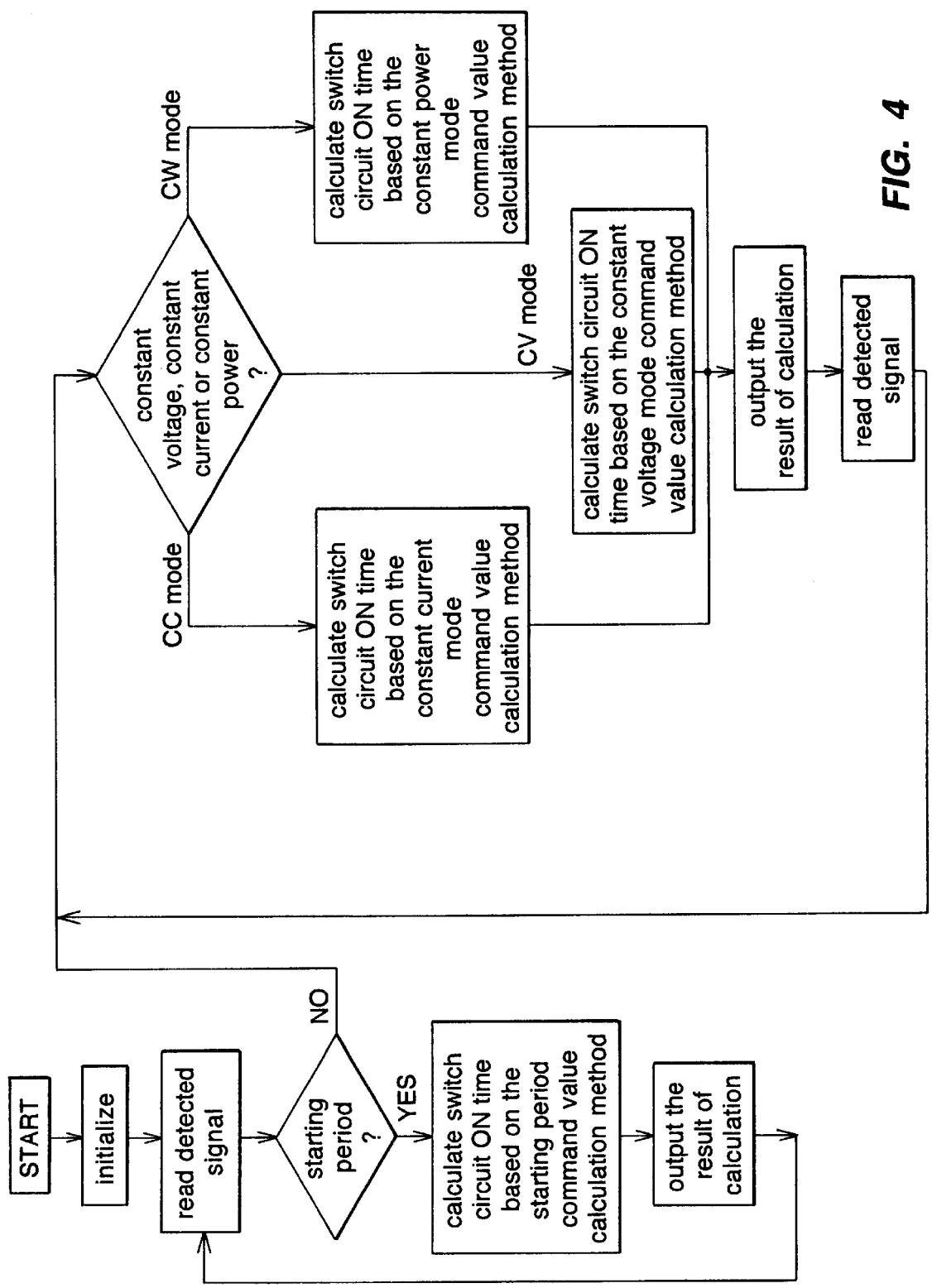
FIG. 4 is a flow diagram showing one example of a control sequence in accordance with one embodiment of the present invention.

Operations of the illustrated embodiment will now be described. FIG. 4 is a flow chart showing the operation of the switching power source arrangement of the present invention. The flow chart includes both the starting operation when the power source is connected to the power source arrangement and the steady operation.

1. Operation During Starting

When the power source is connected to the switching power source arrangement, charging current flows through the diode bridge 21 to the capacitor 22. As the voltage in the capacitor 22 increases to a predetermined value, the starter circuit 30 and the auxiliary power circuit 80 sequentially start to operate to thereby supply electric power to various portions of the switching power source arrangement. The CPU 711 of the digital control 70 functions in accordance with the control program to start the operation of the device. More specifically, as the voltage supplied to the digital control 70 reaches a predetermined value, The CPU 711 sequentially excutes the contents in the control program provided in the program memory 713 to initialize registers in the CPU and the pulse generating section 73. Then, the CPU 711 functions to read the output voltage digital data and the inductor current digital data which has been temporarily stored in the data memories 714 and 715 through the AD converter 721 and 722.

The CPU 711 determines based on the read out digital data whether the device is in the starting period or not. This can be determined for example by storing in the program data memory 713 the output voltage data which would be obtained during then steady operation and comparing the stored voltage data with the read out data.

When it is determined that the device is in the starting period (YES), the on time for the main switch 42 is calculated in accordance with the starting command value calculating means. Based on the result of the calculation, the counters 731 and 732 and the latch circuit 734 are operated to generate pulses having a predetermined on time. The pulses this generated are transmitted through the output circuit 735 as the driving signal. The drive signal is then applied from the pulse transformer 91 of the driving circuit 90 through the resistor 92 to the main switch 42 to produce a primary power which is transmitted to the output circuit 50. Thus, a supply of output voltage is begun. In this instance, the starting command value calculating means is selected to operate, so that it is possible to carry out a soft start control in providing the output voltage to avoid excessive drain current.

The CPU 711 functions to control the ratio of the on time to the off time of the main switch 42 in accordance with the starting command value calculating means until the output voltage V0 reaches the steady value.

2. Steady Operation

When the output voltage V0 reaches the steady value through the aforementioned starting operation, the CPU 711 determines that the starting operation has been finished (NO) and a steady operation is started. The steady operation will now be described.

<General Operation>

The analogue signal of the output voltage V0 in the output circuit 50 is received by the digital control 70 wherein the analogue signal is converted at the digital converter 721 into a digital signal. The digital signal thus obtained is temporarily stored in the data memory 714. The analogue signal AS2 of the inductor current obtained at the inductor current detection circuit 60 is received by the digital control 70 and converted at the digital converter 722 into a digital signal DS2. The inductor current digital signal DS2 is temporarily stored in the data memory 715.

The CPU 711 reads out the contents of the data memories 714 and 715 in accordance with the control program. Then, it carries out a necessary calculation such as four rule operations or logic operations to obtain command values for determining the on time and the off time of the main switch 42. The processing for the command value calculation includes an important operation for presuming the input voltage information based on the output voltage digital data and the inductor current digital data read from the data memories 714 and 715. The CPU 711 may have a function of detecting an input voltage disorder from the input voltage information obtained through the presumption. For example, with a rated input voltage of 100 V, an input voltage range between 90 V and 110 V is determined as normal and an input voltage out of this range is determined as being disorder. The command value produced by the CPU 711 is received by the pulse generating section 73.

Figure 5:
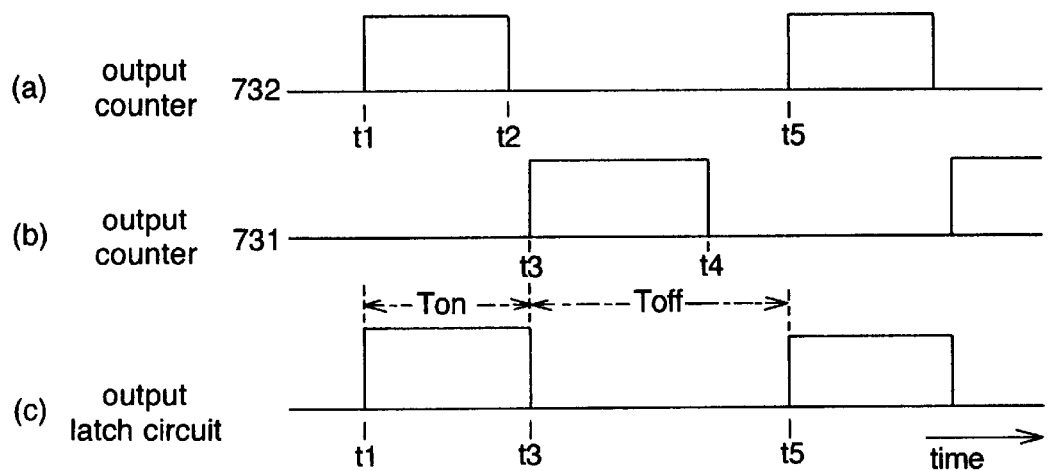
FIG. 5 is a time chart illustrating operation of the pulse generating portion of the switching power source arrangement in accordance with the present invention.

FIG. 5 shows a time chart showing the procedure of pulse generation in the pulse generating section 73. The counter 732 in the pulse generating section 73 is reset at the timing t1 turning the output to logic 1 (FIG. 5(*a*)). The signal from the counter 732 is supplied to the latch circuit 734. The latch circuit 734 is set or turned to logic 1 at the on timing as determined by the counter 732 (FIG. 5(*c*)).

Then, after the on time Ton as determined by the CPU 711 has elapsed, the output of the counter 731 is turned to logic 1 (FIG. 5(*b*)), and the off timing of the main switch 42 is set. The signal from the counter 731 is supplied to the latch circuit 734. The latch circuit 734 is reset at the off timing of the counter 731 so that its output is turned to logic 0 (FIG. 5(*c*)). Thus, the latch circuit 734 produces a pulse for the on time Ton for driving the main switch 42.

The control cycles of the command value calculations by the counters 731 and 732 are determined by the counter 733. The control cycles of the command value calculations by the counters 731 and 732 are each integer m times as large as the switching cycle. With this control, the data memories 714 and 715 store detected signals at each timing which is detected once an integer m cycles of the switching cycles. The CPU 711 reads data from the data memories 714 and 715 and calculates the on time of the main switch 42 in accordance with the command value calculating means (method) for the steady operation. At this instance, presumption of the input voltage information is made as described based on the read out output voltage data and the inductor current data. The results of the calculation are renewed at every control cycle and the command value is supplied to the pulse generating section 73.

The output circuit 735 functions to supply the pulse from the latch circuit 734 through a coupling transformer 91 to the gate of the main switch 42. In this manner, the output voltage V0 and the inductor current I are controlled to maintain values as determined by the control program in the CPU 711.

<Control under Constant Current, Constant Voltage and Constant Power modes>

The CPU 711 selects a different one of the command value calculating means depending on whether the control mode is the constant current mode, the constant voltage mode or the constant power mode. The command value calculation is carried out in accordance with the contents in the control program which is in advance provided in the program memory 713 in the CPU 711.

The control program in the CPU 711 is designed to calculate the on time and the off time so that the inductor current I is maintained substantially constant under the constant current mode, the output voltage Vo is maintained substantially constant under the constant voltage mode, and the product of the output voltage and the inductor current is maintained substantially constant under the constant power mode.

The detection signals for the output voltage V0 and the inductor current I are received by the digital control 70 and a presumption is made based on the signals to obtain the input voltage information, whereby the control is performed to obtain eventually the target value as obtained as the result of the calculation.

Figure 6:
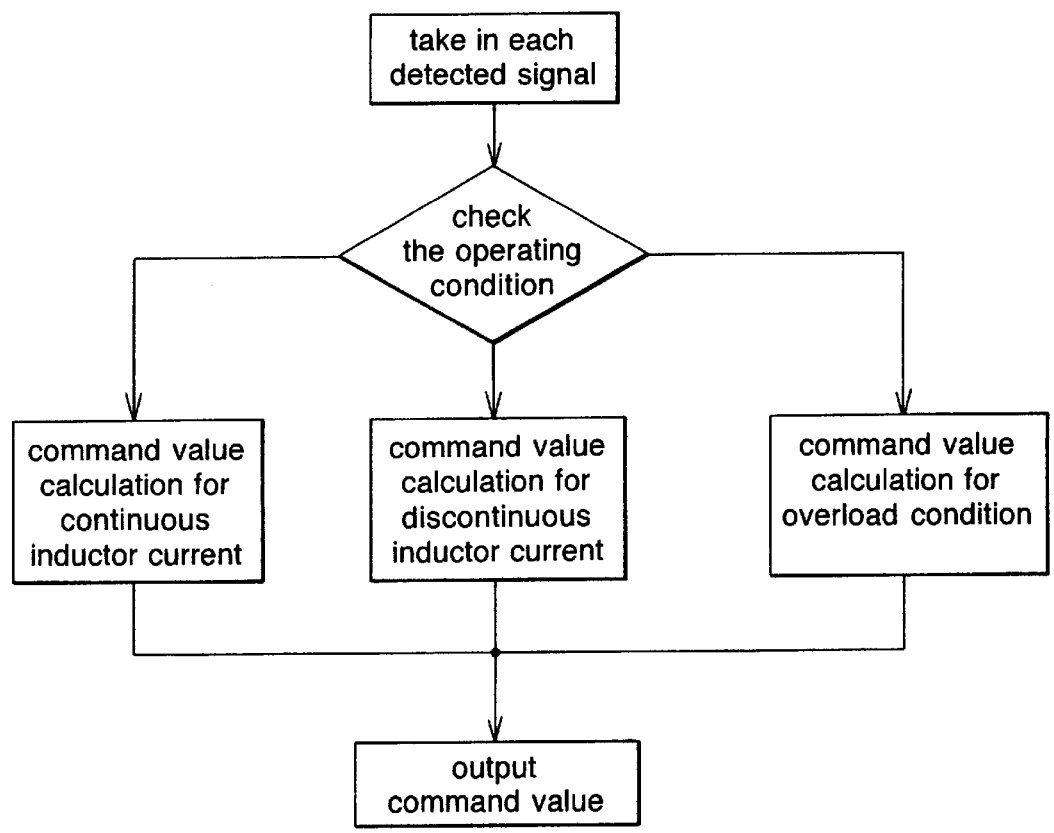
FIG. 6 is a flow chart showing the control sequence in accordance with one embodiment of the switching power source in accordance with the present invention.

In the switching power source arrangement in accordance with the illustrated embodiment of the present invention, the command value calculating means is modified in response to changes in the output voltage, the inductor current and the input voltage obtained through the presumption, so that the steady output voltage is maintained. More specifically, as shown in FIG. 6, whenever the counter 733 is reset (refer to FIG. 3), each detection signal is taken into the CPU 711 (refer to FIG. 3), and each detection signal is compared with that in the previous cycle to determine the operating condition whereby an appropriate command signal calculating program is selected in accordance with the operating condition. For example, when the output voltage is increased to an abnormal value which is detected through a continuous monitoring of the output voltage, the command value calculating means for the over-voltage condition is selected to control the main switch 42 so that the on time of the main switch 42 is decreased.

As to the inductor current on the other hand, when a over load condition is detected, the command value calculating means for the over load condition is selected to thereby decrease the duty factor of on time of the main switch 42 and consequently suppress the inductor current.

Figure 7:
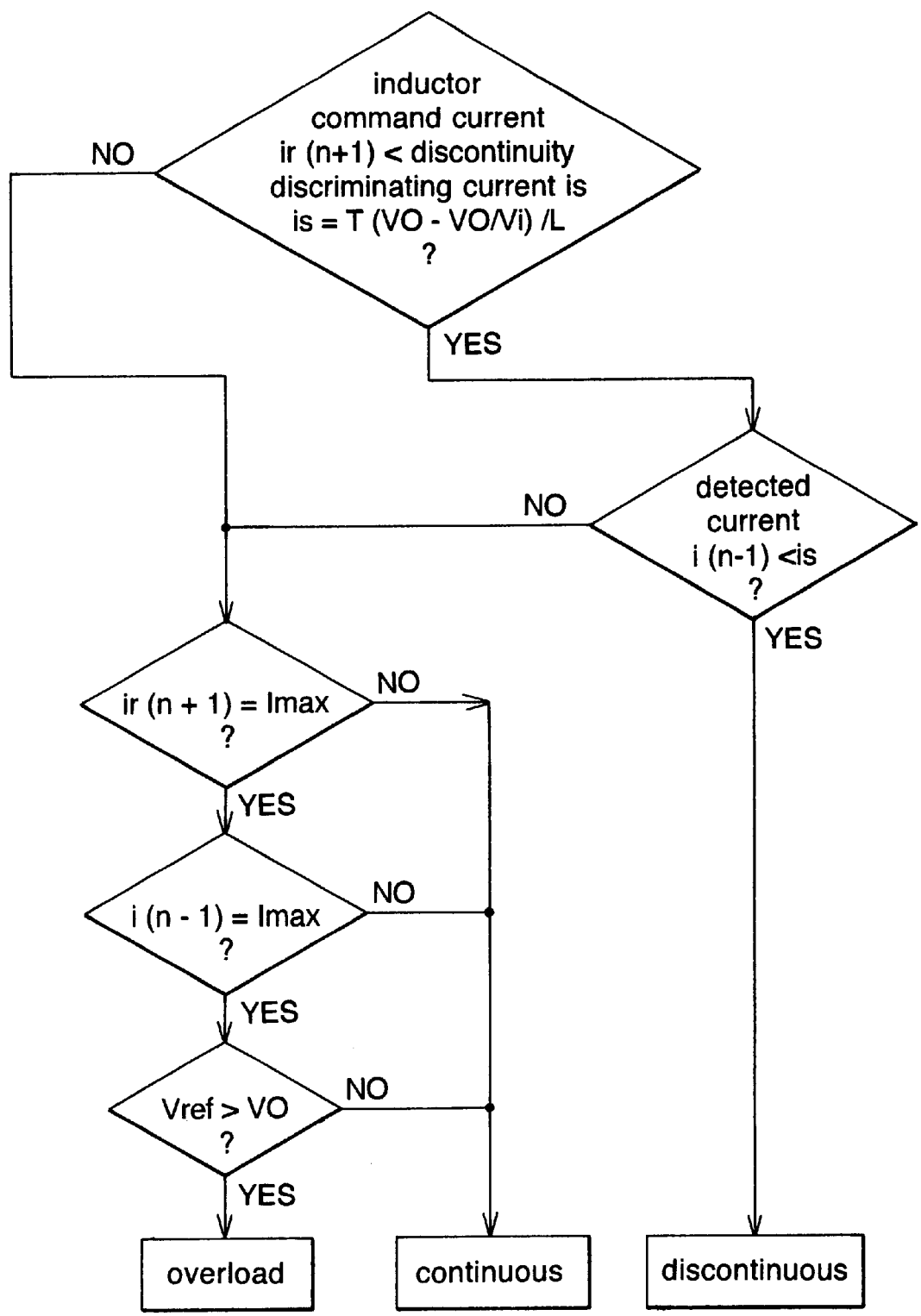
FIG. 7 is a flow chart showing the control sequence in accordance with one embodiment of the switching power source in accordance with the present invention.

Referring to the flow chart in FIG. 7 for example, description will be made on the manner wherein the command value is modified in response to a change in load. For the purpose, the command value calculating means includes control programs for the operation under a continuous induct or current, for the operation under a discontinuous inductor current and for the over load condition, which are provided taking into account that the inductor current changes in response to a change in load and stored in advance in the program memory 713 in the CPU 711. Each of the detection signals is taken into the CPU 711 each time the counter 733 is reset, and each detection signal is compared with the corresponding one in the previous cycle to thereby determine the operating condition and select an appropriate one of the command value calculating programs in accordance with the operating condition.

(1) For the Continuous Inductor Current Condition

The command voltage value Vref and the detected voltage Vo are used to calculate the command inductor current value ir(n+1) based on the following formulae (a) and (b).

$$ir(n+1) = Kvp \cdot \Delta e(n-1) + KVi \cdot \sum_{K=0}^{n-1} \Delta e(K) \quad (a)$$

$$\Delta e(n-1) = Vref - V0(n-1) \quad (b)$$

Further, in order to obtain the command current value ir(n+1), the on time Ton is calculated based on the following formulae (c) and (d).

$$Ton(n) = T\left\{Kip \cdot \Delta i(n-1) + Kii \cdot \sum_{K=0}^{n-1} \Delta i(K)\right\} / Vi \quad (C)$$

$$\Delta i(n-1) = ir(n+1) - i(n-1) \quad (d)$$

(2) For the Discontinuous Inductor Current Op-Operation

Average voltage value and average current value are calculated for every control cycle and based on the results of the calculations the on time Ton is calculated by means of the condition averaging means representing the circuit conditions. The condition averaging formula for the discontinuous inductor current condition is as shown in the following formula (e) so that the on time Ton for the main switch 42 is determined by the following formula (f). It should be noted that the state space averaging method perse using the state space averaging equation has been well known in the art.

$$\frac{d\overline{iL(t)}}{dt} = -\frac{(RL + R11 \; Rc) \cdot \overline{i_L(t)} \cdot (d1+d2)}{L} -$$

$$\frac{R}{(R+Rc)L} \cdot \overline{vc(t)} \cdot (d1+d2) + \frac{vs(t)}{L} \cdot d1 \frac{d\overline{vc(t)}}{dt} = $$

$$\frac{R}{(R+Rc)C} \cdot \overline{iL(t)} \cdot (d1+d2) - \frac{\overline{vc(t)}}{(R+Rc)C} Vo(t) =$$

$$(R11 \; Rc) \cdot \overline{i_L(t)} \cdot (d1+d2) + \frac{R}{R+Rc} \cdot \overline{vc(t)} \quad (e)$$

where: Vo(t) is the output voltage at the time t;

Vc(t) is the terminal voltage of the smoothing capacitor 54 at the time t;

iL(t) is the inductor current of the inductor 53;

L is the inductance of the inductor 53;

d1 is the on duty (=Ton/T) of the main switch 42;

d2 is the on duty (<Toff/T) of the diode 52;

RL is the DC resistance value of the inductor 53;

R is the load resistance;

Rc is the equivalent series resistance (ESR) of the smoothing capacitor 54;

C is the capacitance of the smoothing capacitor 54;

Kvp, Kvi, Kip and Kii are constants

The following conditions are further applied.

Conditions for the inductor current discontinuous mode:

$$\frac{d\overline{iL(t)}}{dt} = 0$$

Average value of the apparent inductor current: $\overline{iL(t)}$ $$\overline{iL(t)} = \frac{\overline{Vs(t)} - \{RL \cdot \overline{iL(t)} + \overline{vo(t)}\}}{2L} d1 \cdot Ts$$

Solving the formula (e) with respect to the on time Ton;

$$Ton(n) = \frac{2L \cdot IL(n)}{Vs(n-1) - Vo(n-1) - RL \cdot IL(n)} \quad (f)$$

(3) Overload Condition

In an overload condition, the relationship Vref>V0 is established so that the command current value ir is always equal to the maximum value Imax stored in the program memory 713 of the CPU 711. It is possible to conduct the current control under the overload condition by defining the maximum value Imax as a function of the output voltage. The maximum value Imax is represented by the following formula.

$$Imax = \frac{Vi - Vo}{2L} \cdot \frac{Vo}{Vi} \cdot T + i \quad (g)$$

(i: average value)

By storing the formulae (a) through (g) in the program memory 713 of the CPU 711 as control programs, it is possible to obtain a stabilized power output even under a fluctuation of load.

The constants Kvp, Kvi, Kip and Kii may be changed to obtain different gains in the control system. The changes in the constants Kvp, Kvi, Kip and Kii may be effected by entering data through for example a keyboard. It is also possible to change the phase characteristics in the control system through a change in the control cycle of the counter 733. It is therefore possible to maintain the stability of the control system even when there is a change in the operating condition.

Figure 8:
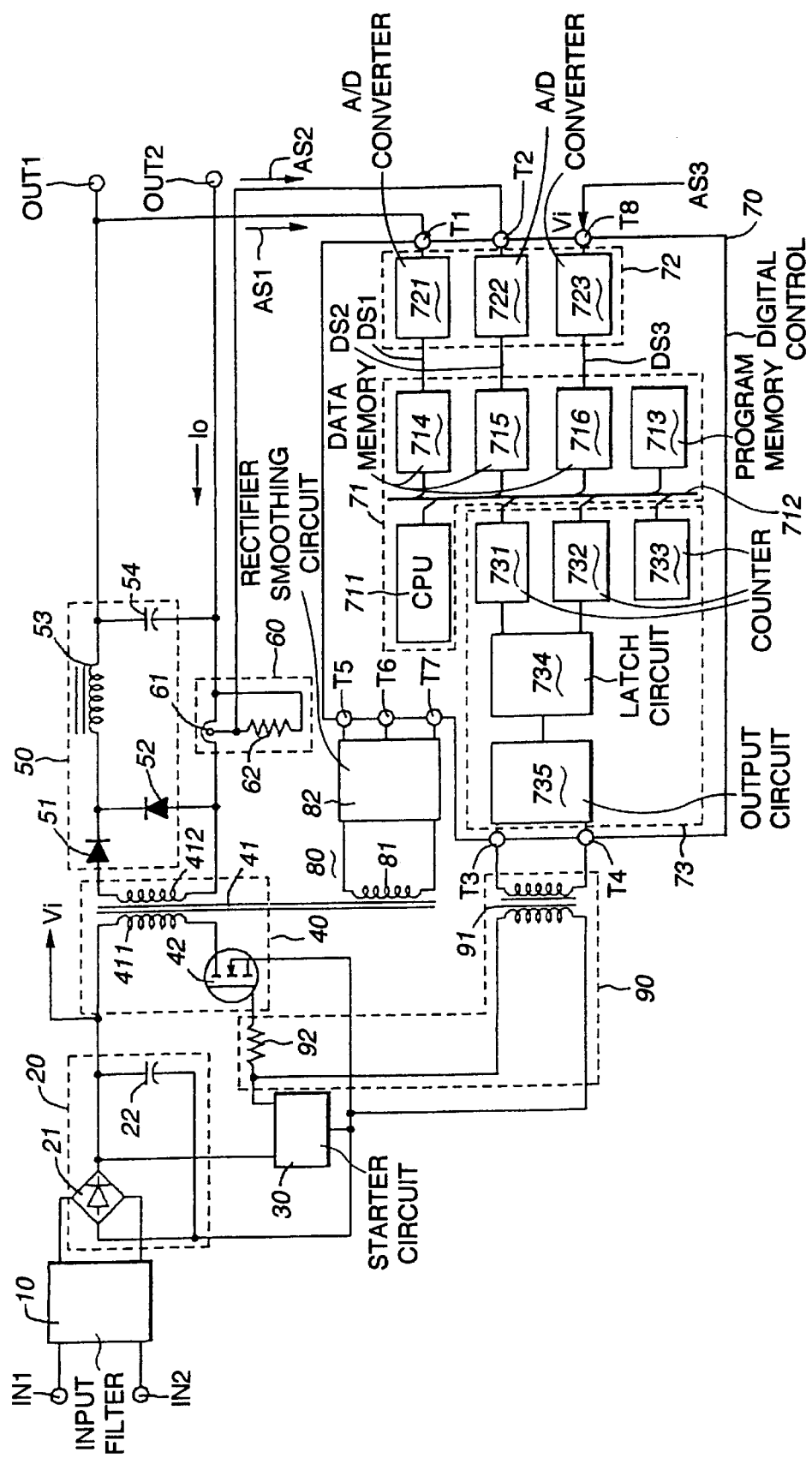
FIG. 8 is a block diagram showing another embodiment of the switching power source in accordance with the present invention.

Other embodiments of the present invention will now be described taking reference to FIGS. 8 through 11. In these embodiments, corresponding components are designated by the same reference numerals as in the embodiment of FIG. 1 and detailed description will be omitted. In the embodiment of FIG. 8, the digital control 70 has an input terminal T8 which receives the analogue signal AS3 representing the power source input voltage Vi, and the digital control 70 functions to convert the analogue signal AS3 into a digital signal DS3. For the purpose, the digital control 70 includes an AD converter 723 and a data memory 716. The CPU 711 reads the digital signal DS3 of the power source input voltage Vi, the output voltage digital signal DS1 and the inductor current digital signal DS2 from the data memories 714 through 716 and calculates based on these digital signals DS1 through DS3 the command value which determines the on time of the main switch 42. With this control, it is possible to obtain a stabilized output not only under a fluctuation of the output signal but also under a fluctuation of the input voltage.

Figure 9:
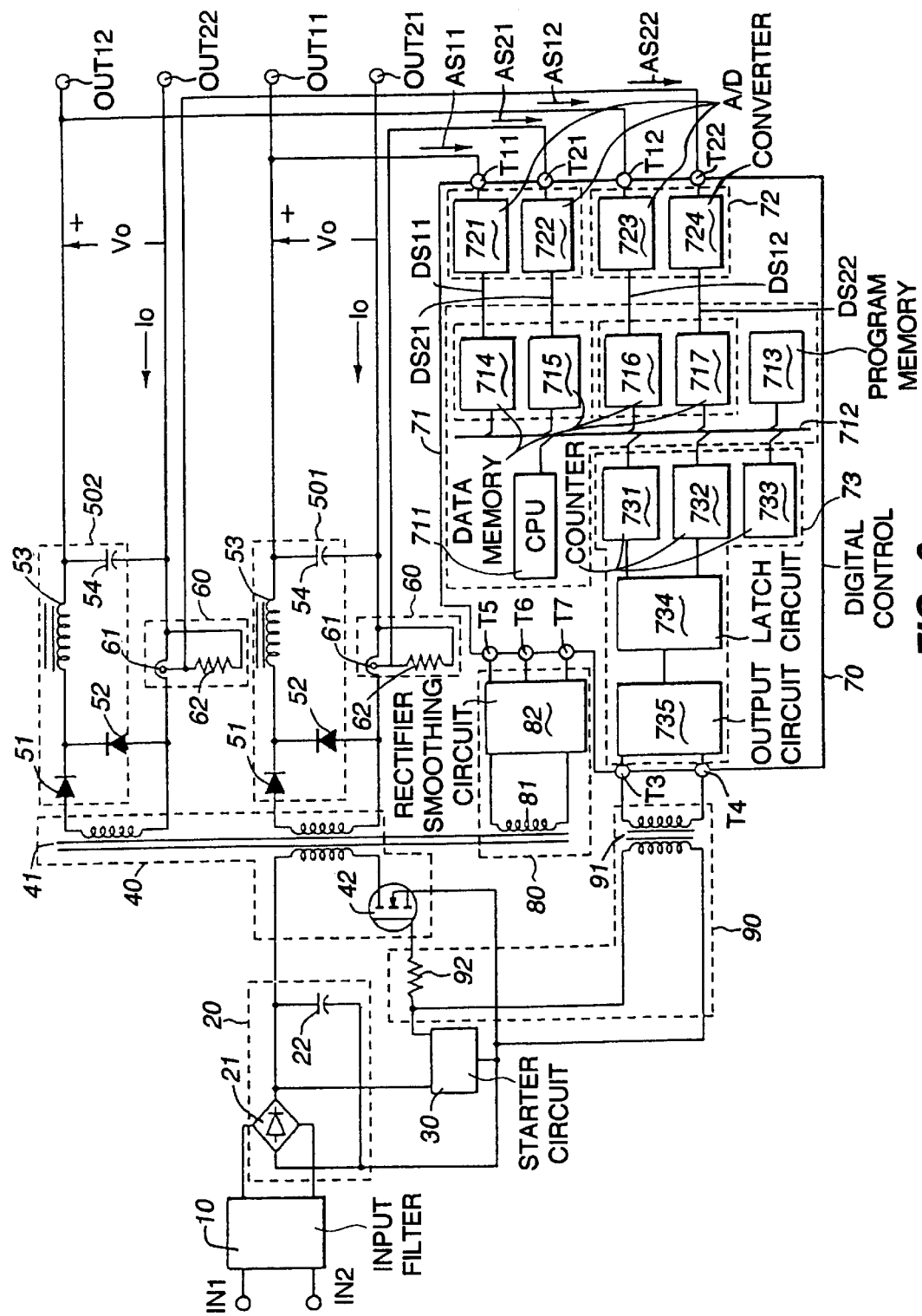
FIG. 9 is a block diagram showing a further embodiment of the switching power source in accordance with the present invention.

In the embodiment of FIG. 9, a plurality of output circuits 501 and 502 are provided for a single switching output. The output voltage analogue signal AS11 and the inductor current analogue signal AS21 in the output circuit 501 are converted into digital signals DS11 and DS21, respectively by the AD converters 721 and 722, and the digital signals are stored in the data memories 714 and 715. The output voltage analogue signal AS12 and the inductor current analogue signal AS22 in the output circuit 502 are converted into digital signals DS12 and DS22, respectively by the AD converters 723 and 724, and the digital signals are stored in the data memories 716 and 717.

In this circuit structure, the digital control 70 preferably functions to control the switching operation of the switching circuit 40 in a manner that fluctuations of the voltage outputs from the plurality of output circuits 501 and 502 are minimized. For the purpose, the CPU 711 reads the digital data DS11 through DS22 from the data memories 714 through 717 through the bus 712 and performs required operations.

Figure 10:
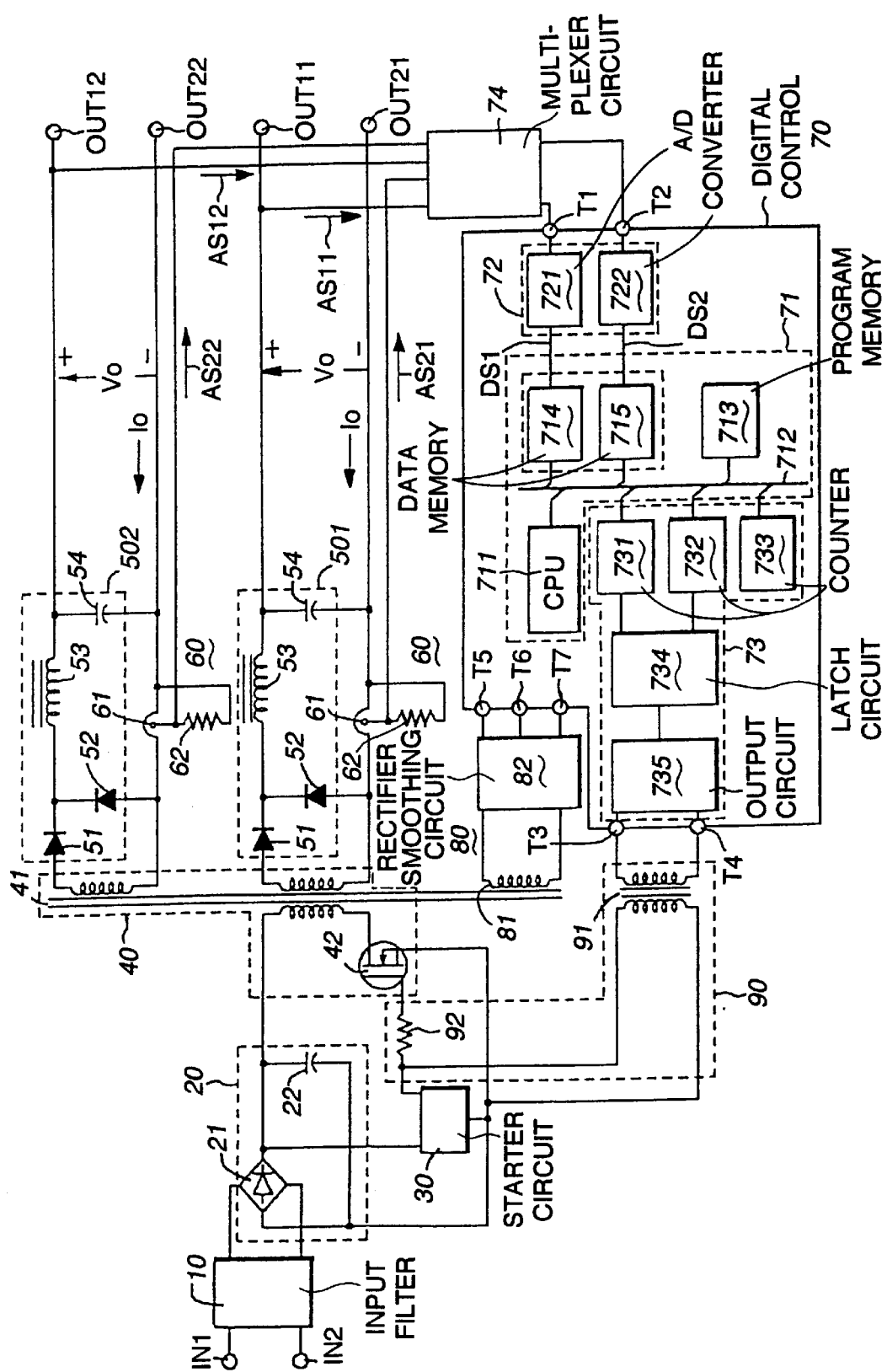
FIG. 10 is a block diagram showing a still further embodiment of the switching power source in accordance with the present invention.

In the embodiment of FIG. 10 which are also provided a plurality of output circuits 501 and 502, there are two AD converters 721 and 722 which are smaller in number than the overall number four of the output voltage analogue signals AS11 and AS12 and the inductor current analogue signals AS21 and AS22 supplied from the plurality of output circuits 501 and 502. There are also provided two data memories 714 and 715 which correspond to the two AD converters 721 and 722. The digital control includes a multiplexer circuit 74. The multiplexer circuit 74 functions to supply the output voltage analogue signals AS11 and AS12 and the inductor current analogue signals AS21 and AS22 from the plurality of output circuits 501 and 502 to the AD converter 721 and 722 in a time sharing basis. With this arrangement, is becomes possible to decrease the number of the AD converters and the data memories.

Figure 11:
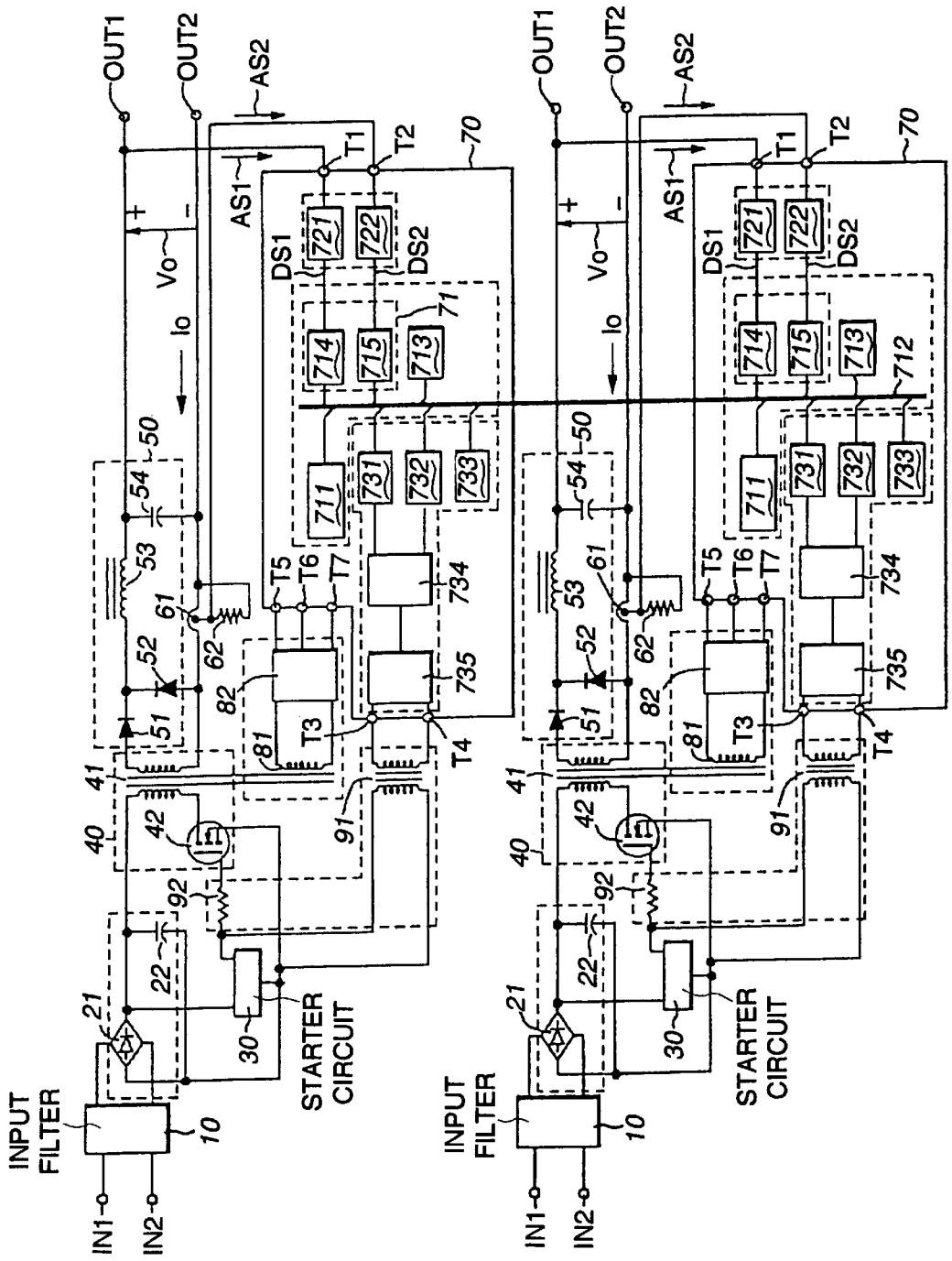
FIG. 11 is a block diagram showing a still further embodiment of the switching power source in accordance with the present invention; and, FIG. 12 is a diagram similar to FIG. 1 but showing an embodiment which is designed to conduct a presumption of the load terminal voltage of the load device.

Referring to FIG. 11, the embodiment shown therein includes a plurality of power circuits each comprising a switching circuit 40, an output circuit 50 and a digital control 70. The digital controls 70 in the respective power circuits have a common bus 12 through which the inductor current can be passed from on to another of the power circuits. The arrangement allows a control of the switching operations of the respective switching circuits 40 in a plurality of switching power source devices having equal rated output power to establish an equilibrium among the values of the inductor current in the respective switching power source devices.

The digital controls 70 in the respective switching power sources passe the inductor current one from the other and vice versa, whereby it is possible in a plurality of switching power source devices having different rated output power to control the switching operations of the switching circuits 40 in a manner that the ratio of the actual output power to the rated power in one power source device is equal to that in the other power source device.

It should be noted that the concept of the present invention is applicable not only to a switching power source arrangement having the illustrated switching circuit 40 and the output circuit 50 but also to a switching power source arrangement of a different structure. It should further be noted that in the embodiments shown in FIGS. 9 and 10 the number of the power circuits can be changed as desired, and, in the embodiment shown in FIG. 11, the number of the switching power source arrangements to be combined can be changed as desired.

Figure 12:
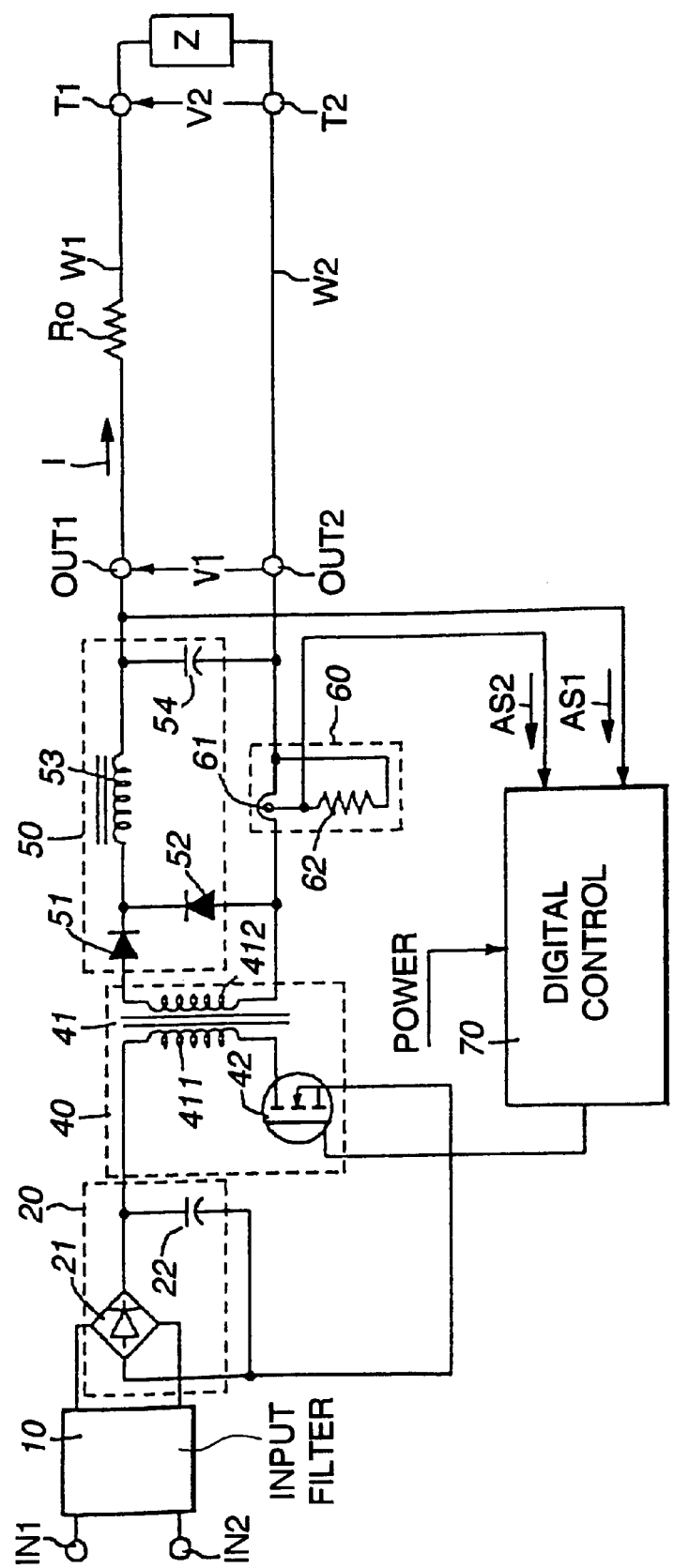

Referring now to FIG. 12, there is shown a block diagram similar to FIG. 1 but showing an arrangement wherein a presumption of the load terminal voltage is made. In FIG. 12, corresponding parts are designated by the same reference numerals as in FIG. 1 and detailed description will be omitted. In FIG. 1, the DC output voltage is designated by the reference V0, however, in the embodiment of FIG. 12, this is designated by V1. The DC output voltage V1 is supplied to the load device Z through load lines W1 and W2 which extend from the output terminals OUT1 and OUT2 to the terminals T1 and T2 of the load device Z. The load lines W1 and W2 have DC resistance values which are determined by their lengths, sizes, specific resistance values, etc. In FIG. 12, The DC resistance value is designated as a whole by the reference R0. In this instance, the load terminal voltage V2 as measured between the terminals T1 and T2 of the load device Z can be represented by:

$$V2 = V1 - I \cdot R0$$

In this formula, the value of the current I is the inductor current which is flowing in the inductor 53 and the reference V1 designates the output voltage of the switching power source, so that the load terminal voltage can be obtained through a presumption based on the inductor current I and the output voltage V1 of the switching power source taking into consideration the DC resistance value R0 of the load lines W1 and W2.

In this embodiment, the digital control 70 calculates the command values which determine the on time and the off time of the switching circuit 40 and if desired the switching cycle, based on the output voltage digital signal and the output current digital signal of the switching power source and the load terminal voltage information which has been obtained through presumption as described. In this embodiment of the present invention, a presumption is made to obtain the load terminal voltage in accordance with the aforementioned formula V2=1-I*R0 based on the DC resistance value R0 of the load lines W1 and W2, the output voltage V1 and the output current I, the terminal voltage V2 at the load device Z can be taken into account in the control.

It should further be noted that the digital control 70 may be of such structure that the DC resistance value R0 of the load lines W1 and W2 can be entered as an external information and such entered DC resistance value R0 be changed. with this arrangement, it becomes possible to determine the DC resistance value R0 to be entered so that is corresponds to the actually used load lines W1 and W2 whenever load lines of different lengths, different size and different resistance values are used to obtain through presumption a load terminal voltage V2 of the load device Z as close as possible to the actual value. In this embodiment, the aforementioned formulae (a) through (g) can be applied using the voltage value V2 in the place of V0.

The invention has thus been described in detail with reference to specific embodiments, however, it should be noted that the invention is in no way limited to the details of the embodiments but various changes and modifications may be made within the scope of the appended claims. Thus, the invention is limited solely by claims.

What is claimed is:

1. A switching power source arrangement comprising a switching circuit for switching an input electric power to produce a switching output of intermittent pulse-like waveform, an output circuit for converting the switching output into a DC power output, and a digital control for controlling switching operation of said switching circuit in accordance with the output of the output circuit;

characterized by
said digital control being operative:
to receive an output analogue signal corresponding to at least one of an output voltage and an output current from said output circuit and convert the output analogue signal into an output digital signal;
to calculate a command value for determining at least one of a switching cycle time and on or off time of said switching circuit based on said output digital signal; and, to produce a control pulse based on said command value and apply the control pulse to said switching circuit to thereby control switching operation of the switching circuit;

the conversion of said output analogue signal to said output digital signal in said digital control being performed in synchronism with the switching cycle in the switching operation of said switching circuit so that the conversion takes place at the same phase in the switching cycle.

2. A switching power source arrangement in accordance with claim 1, wherein:

said digital control includes an AD converting section, a digital signal processing section and a pulse generating section;

said AD converting section being operative to convert said output analogue signal into said output digital signal;

said digital signal processing section being operative to calculate the command value for determining at least one of the switching cycle time and on or off time of said switching circuit based on the output digital signal;

said pulse generating section being operative to generate said control pulse based on said command value.

3. A switching power source arrangement in accordance with claim 1, wherein:

said digital control being further operative to receive an input voltage analogue signal representing a power source input voltage, convert said input voltage analogue signal into an input voltage digital signal, and calculate the command value for determining at least one of the switching cycle time and on or off time of said switching circuit based on said input voltage digital signal and said output digital signal.

4. A switching power source arrangement in accordance with claim 1, wherein:

said digital signal processing section is operative to calculate an average voltage value of said output voltage digital signal and/or an average current value of said output current digital signal, and calculate the command value for determining at least one of the switching cycle time and on or off time of said switching circuit using the calculated average voltage value and/or average current value by condition averaging means which describes circuit conditions.

5. A switching power source arrangement in accordance with claim 4, wherein:

said output circuit includes LC filter and diode for eliminating ripple;

said digital signal processing section being operative to conduct command value calculation processes which are different for conditions wherein inductor current is continuous and inductor current is discontinuous.

6. A switching power source arrangement in accordance with claim 5, wherein:

said digital signal processing section is operative to conduct the calculation of the command value with a cycle which is an integer times as large as the switching cycle of said switching circuit, said digital control being operative to perform the conversion of said output analogue signal to said output digital signal at least once every cycle of said command value calculation.

7. A switching power source arrangement in accordance with claim 6, wherein:

said digital signal processing section is capable of changing a gain-phase characteristics of control through a change in the command value calculating means.

8. A switching power source arrangement in accordance with claim 7, wherein:

said digital signal processing section is capable of changing a gain-phase characteristics of control through a change in the command value calculating cycle.

9. A switching power source arrangement in accordance with claim 1, wherein:

said pulse generating section includes means for setting at least one of the switching cycle time and on or off time of the switching circuit in accordance with the command value supplied from said digital signal processing section.

10. A switching power source arrangement in accordance with claim 1, wherein:

said digital signal processing section is capable of setting its output characteristics to either one of a constant current characteristics, a constant voltage characteristics, and a constant power characteristics, through a change in a manner of calculating said command value.

11. A switching power source arrangement in accordance with claim 1, wherein:

said digital control is capable of receiving external signal for entering and changing said command value calculating means.

12. A switching power source arrangement in accordance with claim 1, wherein:

a plurality of said output circuits are provided for a single switching output.

13. A switching power source arrangement in accordance with claim 12, wherein:

said digital control is operative to control the switching operation of said switching circuit in a manner that fluctuation of output voltage from said plurality of output circuits is minimized.

14. A switching power source arrangement in accordance with claim 13, wherein:

said AD converting section is small in number than a total number of the output voltage signals and the output current signals supplied from said plurality of output circuits;

said digital control including a mutiplexer circuit which functions to supply said analogue signals of said output voltage and said output current supplied from said plurality of output circuits to said AD converting section in time sharing basis.

15. A switching power source arrangement in accordance with claim 1, which further includes:

a plurality of power circuits each including said switching circuit, said output circuit and said digital control, said power circuits being connected with each other with said output circuits being parallel each other;

said digital controls in the respective power circuits being capable of passing said output current digital signal one from another and control the switching operations of the switching circuits in a manner that output current values from the respective power circuits become substantially equal.

16. A switching power source arrangement in accordance with claim 1, which further includes:

a plurality of power circuits each including said switching circuit, said output circuit and said digital control, said power circuits being connected with each other with said output circuits being parallel each other;

said digital controls in the respective power circuits being capable of passing said output current digital signal one from another and control the switching operations of the switching circuits in a manner that ratio of the actual output power to rated power in each of the power circuits is substantially equal to that in the other power circuit.

17. A switching power source arrangement in accordance with claim 1, wherein:
  said digital control includes as a primary component a digital siganl processor.

* * * * *

UNITED STATES PATENT AND TRADEMARK OFFICE
CERTIFICATE OF CORRECTION

PATENT NO. : 6,115,266
DATED : September 5, 2000
INVENTOR(S) : Nobuyuki Matsui, et al.

It is certified that error appears in the above-identified patent and that said Letters Patent is hereby corrected as shown below:

On the title page, item [73]:

Under Assignee: after "TDK Corporation, Tokyo, Japan"
add --Nobuyuki MATSUI,
    12-3, Oshizawadai  7-chome
    Kasugai , Japan--.

Signed and Sealed this

Twelfth Day of December, 2000

*Attest:*

Q. TODD DICKINSON

*Attesting Officer*      *Director of Patents and Trademarks*